Dec. 21, 1965 P. C. KEITH ETAL 3,224,869
METHOD OF REDUCING IRON OXIDE
Filed Sept. 20, 1962
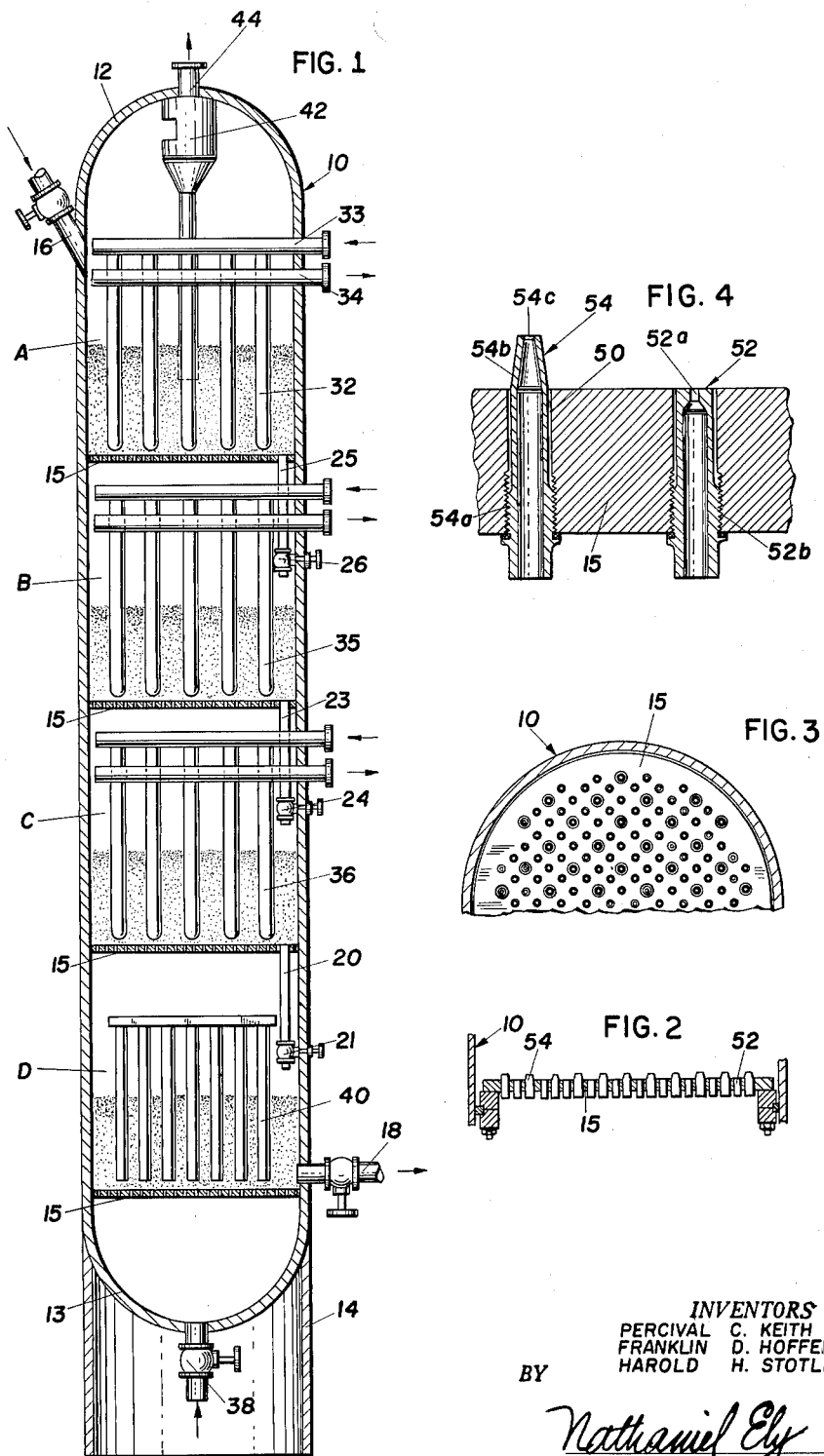
INVENTORS
PERCIVAL C. KEITH
FRANKLIN D. HOFFERT
HAROLD H. STOTLER
BY
Nathaniel Ely
ATTORNEY United States Patent Office 3,224,869
Patented Dec. 21, 1965

3,224,869
METHOD OF REDUCING IRON OXIDE
Percival C. Keith, Peapack, Franklin D. Hoffert, Mountainside, and Harold H. Stotler, Westfield, N.J., assignors to Hydrocarbon Research, Inc., New York, N.Y., a corporation of New Jersey
Filed Sept. 20, 1962, Ser. No. 224,968
1 Claim. (Cl. 75—26)

This invention relates to an improved process for carrying out gas phase reactions in a dense phase fluidized bed of particulate material. More particularly, the invention relates to such a process wherein one of more fluidized beds are supported one above the other for the continuous flow of reducing gases therethrough. It is an improvement on the invention disclosed in the patent to Keith, 2,995,426.

In the aforementioned patent, reference is made to the growing use of the fluidizing technique wherein a mass or bed of finely divided solids is maintained in a fluent and tubulent condition by the upward passage therethrough of a gasiform stream. Such a process has been found particularly effective for the reduction of metallic oxides, more particularly iron ore, by the passage through the dried and appropriately ground ore of substantially pure hydrogen at pressures in excess of 100 pounds per square inch gauge and at temperatures in the order of 750° to 1000°F. Previously it was found desirable to maintain a series of relatively shallow beds, each of which was fluidized by the continuously flowing gas. This was necessary to maintain a uniform contact of the reducing gas with the metallic oxides and to assure distribution of the gas across the respective beds. It was also found essential to have a substantially uniform pressure across the bed to avoid channeling and to limit gas velocities through the bed which would disrupt the bed and actually reduce the gas solids contact.

In a fluidized system for reducing metallic oxides, and particularly iron ore, effective contact is accomplished by the continuous flow of the reducing gas, usually hydrogen, upwardly through the several beds of the powdered oxides. Uniform gas distribution is accomplished by uniformly distributed openings in a grid plate below the beds and the energy required for fluidization is a function of the velocity and amount of gas flow. Uniform fluidization is thus controlled by the pressure difference across the grid plates and this of course varies with the square of the area of the openings with a constant gas flow.

It has been determined by us that this pressure drop must be at least one pound per square inch for the typical iron ore which is reduced and should not exceed about five pounds per square inch. However, it has also been found that the reducing gas discharging from the lowermost bed, and sometimes an intermediate bed, contains entrained solids which tend to stick to the openings in the next above grid plate. As a result, the velocity of gas tends to increase with an increase in pressure drop (which varies with the square of the velocity) until inoperable conditions are reached.

It has also been recognized that as the temperatures go up there is a greater tendency of the particles to adhere, partially due to the stickiness of the reduced particles which are reduced by hydrogen, and partially due to the variations in velocity.

In accordance with our invention, we provide an improved gas distributor to maintain continuity of gas flow and uniform pressure drop across the bed on a horizontal plane.

Our invention is primarily drawn to the effective distribution of gases in a fluidized reactor where the temperatures and pressure and densities of the material is such that relatively large volumes of gas at high velocities are required to maintain fluidity and the distributing elements must be free from erosion as well as preventing compacting and plugging from the reacting materials.

A further object of the invention is to provide controlled differential pressure conditions in adjacent fluid beds to permit gravity flow of partially reduced fluid beds to subjacent beds without restricting the flow of reducing gases.

Further objects and advantages of our invention will appear from the following description of a preferred form of embodiment thereof when taken in connection with the attached drawings illustrative thereof and in which:

FIGURE 1 is a vertical section of a multistage reactor embodying the invention.
FIGURE 2 is a vertical section on a larger scale showing the deck construction.
FIGURE 3 is a partial plan of the gas distribution deck.
FIGURE 4 is an enlarged vertical section showing the different types of gas distributing jets.

The reactor generally shown at 10 is preferably a cylindrical tower having a hemispherical top 12 and bottom 13, the bottom being supported on a cylindrical extension 14. This extension or skirt 14 is usually provided with access openings, not shown, and is of sufficient height to give the desired head room under the bottom 13.

The reactor 10 is divided into a plurality of sections or beds, or reaction zones indicated at A, B, C and D which are established by the horizontal partitions 15. Generally, there are at least three beds and they serve to receive and hold the metallic oxides during the reduction period.

Solids are initially added to the reactor 10 as by suitable dense phase transport through line 16 and after reaction is completed, the solids transfer out of the bottom bed D through conduit 18. This, in turn, permits dumping the next bed C above through downcomer 20 by opening the valve 21. The next above bed B can then be discharged through the downcomer 23 by opening valve 24 and similarly the topmost bed A will pass by gravity downwardly through downcomer 25 when valve 26 is open. Thereafter fresh feed is again introduced to the top bed through the inlet 16.

While the particular partition structure essential to successful operation of reducing metallic oxides is disclosed in the aforementioned patent to Keith, for the purpose of understanding this invention, it is found desirable, as set forth in the aforementioned patent, to provide vertical baffle surfaces in the respective zones to establish and maintain suitable fluidity. These baffles are preferably tubular heat exchange elements, the upper bed A being provided with series of U-tubes 32 supported from headers 33 and 34. Heat exchange material which may be liquid or, as preferred, the hydrogen gas which is to be used as the reducing medium will pass through these tubes. In a similar manner, the lower beds B and C may be suitably provided with similar heat exchange tubes 35 and 36 each of which is provided with suitable inlet and outlet headers.

For the purpose of this invention, the reducing gas (hydrogen) is shown as entering the bottom bed D through inlet 38. Tubes 40 in bed D may be dummy tubes solely for aids to fluidization or they may be heat exchange tubes as desired. The hot reducing gas then serves as the fluidizing medium for each of the beds D, C, B and A, ultimately discharging through cyclone separator 42 to gas outlet 44.

As more particularly shown in FIGURE 4, the grid plate 15 below each of the beds is suitably perforated as at 50 and as more particularly shown in FIGURE 4, the perforations are suitably fitted with injector nozzles 52 and 54. The injector nozzle 52 is adapted to be of the flush type and is adapted to have a relatively short section with a relatively small outlet opening 52a to serve as a nozzle and to develop a high velocity gas stream. The majority and preferably three-fourths of the nozzles as distributed across the deck or grid plate, as shown in FIGURE 3, are of this type. Conveniently, these nozzles are provided with suitable screw type shanks 52b so that they may be removed rapidly for replacement or repair when necessary.

In addition, we find it especially desirable to provide a substantial number, generally about 20-30%, of all of the nozzles of the type shown at 54 which is provided with a screw shank 54a adapted to be screwed into the same type of opening in the grid plate. This type nozzle is also provided with a projection portion 54b which substantially extends above the surface of the deck. This nozzle is likewise provided with a controlled size opening 54c which exerts substantially the same pressure drop as that in nozzle 52. This is preferably in the range of 1-2 p.s.i.

While it is not entirely clear as to why a generally regular spacing of the projecting nozzles 54 in the pattern of the other nozzles 52 so influences the fluidization of heavy ore beds, it has been repeatedly demonstrated that over long periods of time there is a more uniform pressure drop when the two types of nozzles are used than when all are of the flush type or all are of the extended type. It appears, however, that the reason for such uniformity of fluidization is possibly due to the supplemental energy given the fine particles which are supported by the short nozzles and kept in the air by the long nozzles. In any event, it is considered that at least 20% of the extended nozzles which project in the order of one inch above the plate will give a longer trouble-free operation in the reduction of iron ore than in units without such construction.

The pressure differential between beds is critical for any completed reactor. The flow of solids through a downcomer is of course counter to the continued upflow of the reducing gases and to assure free flow, the density of the solids in the downcomer must be greater than this pressure differential. For example, if a 5 p.s.i. pressure difference is a maximum and solids flow is sufficiently rapid for commercial operation, any plugging of nozzles which requires an increased pressure differential will prevent flow unless the reducing gas flow is reduced.

The temperatures and pressures of operation in the present case are not materially influenced by the type of nozzles and it is merely a question of establishing continuity of operation.

It will be noted that in an operation of this type it is found desirable to have a uniform time cycle which results in maintaining substantially the same amount of solid material on each of the four beds with, of course, the recognition that there is a continuous removal of gaseous products in each stage. As previously mentioned, temperatures for the reduction of magnetite and hematite seldom need to exceed 1000° F. and are generally below 1400° F. for other ores such as ilmenite. Commercial acceptable reduction rates are obtained with hydrogen reduction at pressures in excess of 200 p.s.i.g. and with hydrogen purity in excess of 80%, and with gas velocities upwardly through the bed in the order of one to two feet per second. Commercially, the reactors are of at least four feet in cross section with the beds, as set by the grid plates 15, at least four feet deep. Reductions up to about 97%, if the oxide is iron oxide, is commonplace in accordance with our invention.

While we have shown and described a preferred form of embodiment of our invention, we are aware that modifications may be made thereto and we, therefore, desire a broad interpretation of our claim within the scope and spirit of the hereinabove description.

We claim:

The method of reducing iron oxide with hydrogen at pressures in excess of 200 p.s.i.g. and at temperatures under 1400° F. which comprises passing hydrogen upwardly and serially through each of a series of superposed vertically spaced reaction zones, each reaction zone containing a bed of solids of iron oxide, periodically passing said solids from an upper zone to a lower zone and finally discharging the solids from the lowermost zone, introducing said hydrogen into each of said beds at a controlled velocity through nozzles uniformly distributed throughout the bottom of each bed to establish a pressure drop between the beds of the order of one to five pounds per square inch, the nozzles of each bed projecting different distances into the bed to introduce the hydrogen at points vertically spaced in the bed, 20% to 30% of the nozzles introducing the hydrogen at a level higher than the remaining nozzles, preventing the flow of solids from an upper bed to a lower bed for a predetermined period to cause the desired reduction of the solids in each bed, and thereafter removing substantially all of the solids from a lower bed before introducing the solids from an upper bed into the lower bed.

References Cited by the Examiner

UNITED STATES PATENTS

| | | | |
|---|---|---|---|
| 2,562,813 | 7/1951 | Ogorzaly et al. | 75—26 |
| 2,639,973 | 5/1953 | Fritz | 23—288.3 |
| 2,826,487 | 3/1958 | Davis | 75—26 |
| 2,864,688 | 12/1958 | Reed | 75—26 |
| 2,995,426 | 8/1961 | Keith. | |
| 3,017,254 | 1/1962 | Evans et al. | 23—288.3 |

BENJAMIN HENKIN, *Primary Examiner.*